Dec. 19, 1933. E. HOPKINS 1,939,701
VEHICLE BRAKE
Filed July 20, 1931
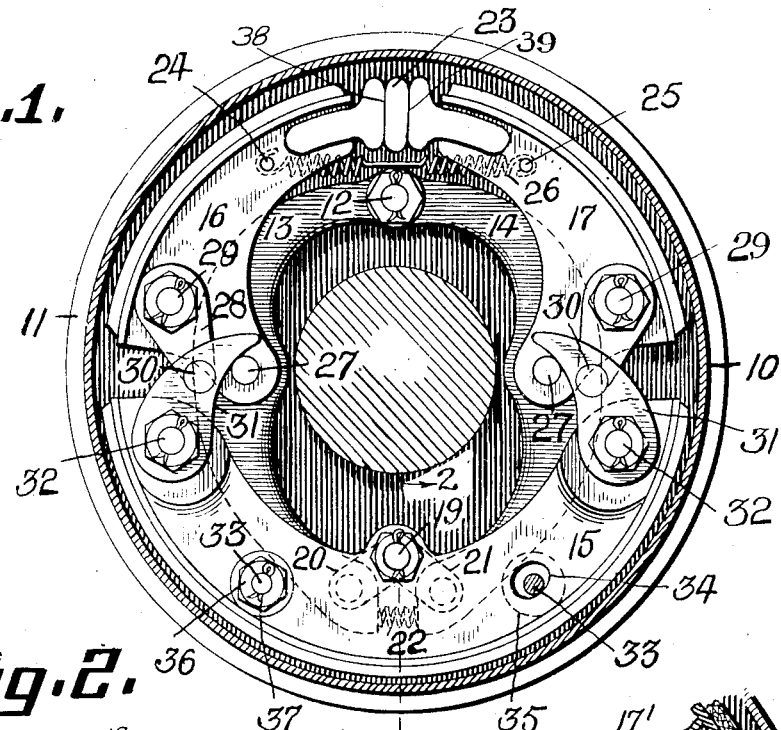
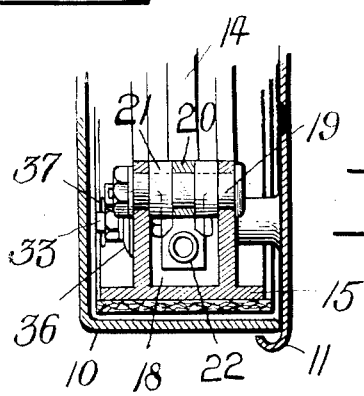
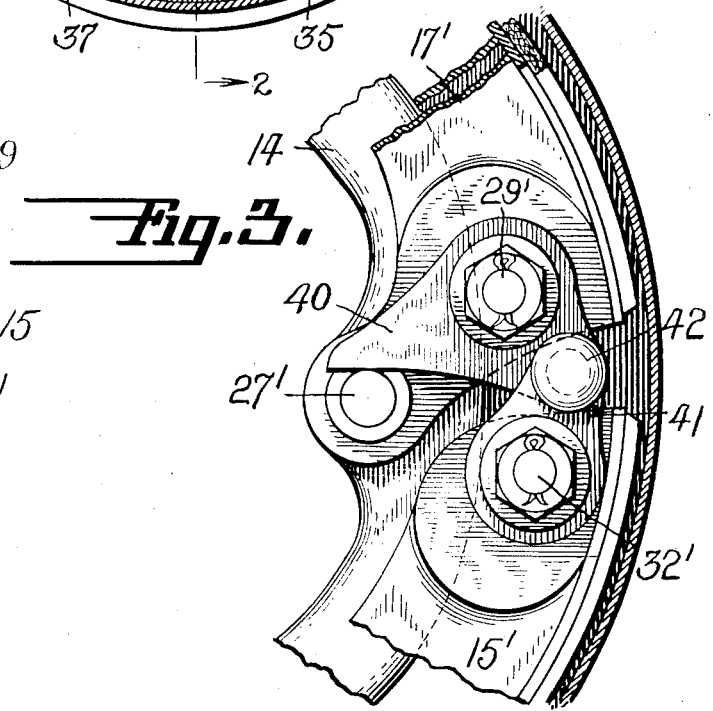
INVENTOR
EUGENE HOPKINS
By J. B. McGiver
ATTORNEY Patented Dec. 19, 1933

1,939,701

UNITED STATES PATENT OFFICE 1,939,701

VEHICLE BRAKE

Eugene Hopkins, Glen Cove, N. Y.

Application July 20, 1931. Serial No. 551,947

17 Claims. (Cl. 188—78)

This invention relates to brakes for automobile or other motor power machines, wherein the mechanical or hydraulic power is applied from an exterior source by the operator to apply friction on the drums on the wheels, for retarding the forward or backward movement to the vehicle.

The object of my invention is to provide a novel and effective shoe construction and arrangement whereby the greater efficiency may be gained by the use of the toggle connections for creating and effecting the operation on the shoes with greater braking force in either direction than has heretofore been attained.

Another object of my invention is to provide a brake for automobiles or other vehicles by the transfer of motion from point to point in its construction, which is compounded and increased from the power output, with a frictional device that attacks the entire inner surface of a revolving drum when applied to its fullest extent, yet has for its purpose the retarding of said motion, and to give an even and gradual tension that is intended for efficiency and durability.

The invention will be better understood from the following description, taken in connection with the accompanying drawing wherein is shown what is now considered the preferred form, while the drawing illustrates merely an example of means for putting my invention into practice on automobiles, or other motor power vehicles; its scope will be pointed out in the specification and in the appended claims.

Further objects and advantages will become apparent as the description of my invention is hereinafter developed.

Referring to the drawing, Fig. 1 is a vertical section through the brake just inside the drum, showing the shoes and their operating parts in elevation; Fig. 2 is a sectional view on the lines 2—2 of Fig. 1; and Fig. 3 is an enlarged view of the eccentric action shown in Fig. 1.

It will be noted from the drawing that my brake, when assembled and adjusted to the particular vehicle, will not require any further adjustments thereafter for any reason whatsoever, as my novel construction and arangements of parts automatically, as it were, take up all wear by reason of the lining wearing out. The above applies equally well to front or rear wheels.

Referring to Fig. 1, 10 represents the drum in section, and 11 the backing plate, which is usually used to mount and support the internal brakes, and securing same to axes. Centrally mounted on said back is an anchor stud 12, upon which partial stress of impelling action of this device in its operation is maintained. Secured to stud 12 are two arms 13 and 14 passing around and defining an inner ring, hingedly supported on said stud, while their lower ends are attached to upper central part of the lower shoe, as will be explained.

The arrangement of my brake comprises a central lower shoe 15, and upper auxiliary shoes 16 and 17, each of said members being lined on their outer face with the usual friction creating material. The shoes 15, 16 and 17 are each provided with an inner channel 18, wherein operate the links 13 and 14. A stud 19 is associated with the shoe 15, and carries suitable double acting toggle links 20 and 21, to which the lower ends of arms 13 and 14 are secured. A suitable coil spring 22 is interposed between the two ends of said arms to hold them in a spread position so as to restore them to inoperative position; said toggles 20 and 21 and the arms 13 and 14 being confined within the channel 18 which holds them secure and prevents unnecessary action of the joints when not operating (see Fig. 2).

The upper ends of the auxiliary shoes 16 and 17 rest against the operating cam 23. This cam which is for the purpose of spreading the shoes, may be operated by hand, foot or otherwise, or even be applied to any hydraulic operating means. As the method of operating said cam forms no part of my invention, no claim is made for its method of operation. The shoes 16 and 17 above mentioned are provided with pins 24 and 25, to which is secured a double curled spring 26, which holds the free ends of the shoes 16 and 17 against the operating cam 23. The operation of the cam action between the auxiliary and secondary shoes is the same on each side. If a swivel or floating action of cam is used, or hydraulic or pneumatic devices for expanding same, the self-energizing effect increasing friction will result and add to the efficiency of device. It will be understood that they are identical in their operation and effects, and operate in either direction of drum revolution.

The auxiliary shoe 16 has a downwardly and inwardly extending part that carries a roller stud 27, while above the same is hinged an arm 28, pivoted at 29, said arm 28 having a stud 30 which is secured to the cam link 31, which latter is pivoted on stud 32 carried by the secondary shoe 15. The pivots 29 and 32, which connect the upper or auxiliary brake shoe 16 to the lower or secondary brake shoe 15, may be constructed to act as a compression joint and hold the distance created by the eccentric action of the operating parts and purposely retard any extended action of cam or opening method which warrants positive equalizing of all should two or four wheel brakes be used, as the frictional surfaces wear thinner, or depreciate by the continued operation of the braking device. Thus, when the operating cam 23 is set in an inclined position by the braking device, be it mechanical, manual or hydraulic, as soon as the power is applied to this cam, it will cause the spreading of the auxiliary shoes 16 and 17, and the downward thrust of the secondary shoe 15. The said shoe being hingedly connected at both ends by cam link 31 with stud 30 and roller stud 27, acts as a check for the downward thrust of the shoe 15 and moves outwardly in passing.

It is possible by changing the position of the link 31 where joined by the stud 30, outwardly, to increase the distance between the secondary shoe 15 and two auxiliary shoes 16 and 17, and to further increase the thrust by turning of the cam lever or eccentric action.

As has been noted, the anchor stud 12 holds the arms 13 and 14 secure by any suitable locking means, while the lower part of the central or secondary shoe 15 is provided with two other studs 33 extending from the plate 11 through the channel 18. Inside and outside each web of the channel are placed suitable spring washers 35 held in place by a nut 36 which is locked by a cotter pin 37 to prevent any movement. By this arrangement of the shoe 15 being able to move freely about the stud 33, said shoe adapts itself according to the pressure from the operating cam 23. This forms not only a three point supporting means for the braking device, but is designed to hold the parts secure against vibration, and keep the several cooperating parts in proper alignment under all conditions.

Reference is now made to Fig. 3 wherein is shown a modified form of operating the several shoe members by a different form of eccentric action from that shown in Fig. 1. To the shoe 17' is attached a triangular shaped member 40, its upper end being secured to said shoe by means of the stud 29', while the shoe 15' has a link 41 pivoted on stud 32' with its free end secured to stud 42 of the triangular member 40. The free end of said member rests upon the stud 27' to give the necessary action to the parts. This method of operation only reverses the swing of toggle and may be used should one pin be made to operate as a compression joint and maintain distance or thrust to lower shoe created by action of cam.

The spring 26 (Fig. 1), which is connected to pins 24 and 25, restores the operating faces 38 and 39 of shoes 16 and 17 to their proper position against the operating cam 23, and can operate in channel 18 as spring 22, it being designed as shown to clear cam 23 and anchor stud 12. The lower ends of the arms 13 and 14 are restored to inoperative position by spring 22 as above noted. This spring also acts to hold the parts against any action that may cause them to rattle in any manner.

From the foregoing description of my invention, will be seen that the present brake is of the self-energizing type, that upon the first application of power, 50% of the braking surface is applied, it matters not whether the direction is forward or backward, and by further application of power to the operating cam 23, it brings the two auxiliary shoes 16 and 17 into contact with the brake drum 11 and the shoes attack the entire inner surface of drum 10 and thus complete its action as a brake on the wheels, and the power may be such as to totally lock the wheels completely.

By reason of the shoe 15 having such a short distance to travel to make contact with the drum 10, it will be seen that the whole of its friction surface is brought immediately in contact with the drum, while the upper frictional surfaces of the other two shoes will have to move further to cause pressure on the shoe 15 by reason of the cam lever 31, thereby forcing the toggles 20 and 21 apart, raising the roller studs 27, and bringing the friction surfaces of the shoes 16 and 17 in contact with the drum.

From the above, it will be noted that the outer surfaces of the shoes are so arranged by their connection to the arms 13 and 14 that the lining or frictional material on the secondary shoe 15 is concentric with the drum, but the auxiliary shoes 16 and 17 are eccentrically arranged with respect thereto, when the shoes are in their normal or inoperative position, thus giving the greatest effective engagement when forced in contact therewith. The rotation of the drum adds mechanical energy to the operating parts when the brakes are more or less applied, by which action the shoes are self-energized and act positive, uniform and reliable in every way.

A brief description of the operation of the parts are, as follows: When the operation cam 23 is moved by any approved method, the upper braking members 16 and 17 are forced apart at top, thereby moving them outwardly and downwardly with a hinge action caused by same being pivoted to supporting arms 13 and 14 by studs 27. Each of said shoes 16 and 17 at their lower end is provided with a stud 29, on which is suitably secured a lever 15. The lower shoe 28 has secured to each of its free ends a stud 32, holding thereon a cam acting lever 31, which latter is secured to lever 28 by stud 30. Thus it will be seen that the pivots 29, 30 and 32 and their coacting parts causes a direct connection between the several shoes.

The point where said stud 29 is attached to shoes 16 and 17, presses the same downward as the upper shoes are spread apart by the cam 23, and causes a thrust to the bottom member 15. Any downward movement of the parts coupling these members 15, 16 and 17 together forces it to open in pressing the pin 27 against which the cam face lever 31 is resting. By this, downward movement of the studs 29, 30 and 32 expands and increases the motion or thrust to the lower shoe 15.

Any movement lowering shoe 15 is communicated to supporting arms 13 and 14, by the links 20 and 21 attached to said arms, and to shoe 15 at 19, causing a spreading action to these arms that have the shoes 16 and 17 secured to them at 27; as the pressing action of the cam link 31, between the upper and lower shoes, causes this expansion at stud 27. This action progresses by pressure exerted at point 27 by an outward and upward movement of the shoes 16 and 17; creates expansion at the lower ends of said shoes, where same first touched inner surface of drum. From this, expansion of the arms 13 and 14 causes the several shoes to cover practically the entire inner surface of the revolving drum.

If additional power is applied to give further movement to the cam 23, the resulting stress creates friction to retard the action of the drum and cause it to stop. To release of the braking device causes the restoring of the various shoes and their cooperating parts in their inoperative position, in which position they will remain set, with such clearances as may be caused by wear or by depreciation of friction surfaces of the brake shoes. Thus the power from 23 is applied to 29, then to 30, and by its connection to the cam lever to 32, thence to 19, and by the double links 20 and 21 back to 27. As arms 13 and 14 swing on their pivot 12 spreads the studs 27 and the cam link 31 riding on the said stud causes 30 also to spread, which action causes the shoe 16 and 17 at 29 to come into contact with the drum.

For instance, when going forward the operating cam 23 causes the shoe 15 to come into contact with the drum, and by reason of the direction of the drum the heel of the shoe starts contact, and by the rotation of the drum 11 is caused to apply the greater force, likewise, in backing the vehicle, the rotation of the drum carries the auxiliary shoe 16 against it and thereby imparting braking power of at least 75% of its capacity, and by continued application of power, causing the entire assembly to be applied against the drum.

With the three shoes, better facilities are offered for a complete braking of the vehicle, and with my arrangement of the operating parts, it makes a most desirable combination, while the fact that the brake mechanism requires no adjustments whatsoever after installation is a point that has not as yet been attained by any other like mechanism now on the market.

In accordance with the provisions of the patent statutes, I have herein described the principle and operation of my invention, together with the means which I now consider to represent the best embodiment thereof, but I desire to have it understood that the means shown are only illustrative and that the invention may be carried out by other means. Also, while it is designed to use the various features and elements in the combination and relations described, some of these may be altered and others omitted without interfering with the more general results outlined, and the invention extends to such use.

Having thus described the end sought by me, what I claim as new and desire to protect by Letters Patent is:

1. A brake comprising, in combination, a drum, a support, a pair of arms pivotally connected to said support, a lower brake shoe, a pair of upper brake shoes, said lower brake shoe being connected to said arms and to each of said upper brake shoes.

2. A brake for a vehicle comprising, in combination, a drum, a main retarding device, an auxiliary retarding device operatively connected thereto, said devices being successively movable into engagement with said drum, and means for transmitting movement of said auxiliary device to said main device, movement of said main device causing further movement of said auxiliary device.

3. A brake for a vehicle comprising, in combination, a main retarding device, a pair of auxiliary retarding devices, a pair of sets of articulating means between said main and auxiliary retarding devices, means for causing movement of said auxiliary devices, said movement being transmitted through one set of said articulating means to said main device, and movement of said main device being re-transmitted to said auxiliary devices through the other set of articulating means to cause further movement of said auxiliary devices.

4. A brake comprising, in combination, a drum, a support, a pair of arms pivotally mounted on said support, a three-part brake shoe within said drum, each part of said shoe being pivotally connected with said arms and with another part of said shoe.

5. A brake comprising, in combination, a drum, a support, a pair of arms pivotally mounted on said support, a lower brake shoe, a pair of upper brake shoes, means including an upper brake shoe for moving said lower brake shoe into engagement with said drum, said movement being transmitted through said arms to said upper brake shoes to cause them to engage said drum.

6. A brake comprising a drum and a floating retarding device consisting of three interconnected rigid sections, certain of said segments being successively movable into engagement with said drum, means to transmit movement of one of said sections to the other two, said means constituting the sole means of support of said retarding device.

7. A friction device for a brake comprising, in combination, a central shoe, an auxiliary shoe at each end of said central shoe and connected thereto, supporting means for said shoes comprising a pair of pivotally connected arms, means connecting the lower ends of said arms to said central shoe, each of said auxiliary shoes being connected to one of said arms intermediate the ends of the latter.

8. A device of the character described including a lower brake shoe and a pair of pivotally mounted upper brake shoes, cam means for spreading said upper brake shoes disposed therebetween, eccentric means between said lower brake shoe and said upper brake shoes and adapted, upon movement of the latter, to move said lower shoe downwardly, and means actuated upon movement of said lower shoe to cause further movement of said upper shoes.

9. A brake comprising a drum, a pair of arms pivotally supported therein, a central brake shoe, toggle means connecting said arms to said brake shoe, a pair of auxiliary brake shoes disposed at the ends of said central brake shoes, said auxiliary shoes being pivotally connected to said arms, and means including cam levers for connecting said central and auxiliary brake shoes.

10. A brake comprising a drum and a retarding device therein, said retarding device comprising a brake shoe pivotally mounted auxiliary brake devices eccentrically and adjustably coupled to said shoe at the ends thereof, movable cam means for actuating said retarding device, the movement of said cam means being transmitted through said auxiliary brake devices and eccentric couplings to said brake shoe to force the latter into engagement with said drum.

11. A brake comprising, in combination, a drum, a support, a retarding device within said drum depending from said support, said retarding device including a multi-part brake shoe and a pair of pivoted arms disposed between and connected to said shoe and said support, and cam means for actuating said retarding device, said arms being pivoted adjacent said cam means.

12. A brake comprising a drum, a retarding device within said drum, said retarding device including a multi-part brake shoe and a pair of pivoted arms, means including a toggle for connecting said arms to one part of said shoe, the remaining parts of said shoe being hinged to said arms.

13. A brake comprising, in combination, a retarding device including a pair of arms pivotally mounted in said drum, a lower brake shoe, a pair of upper brake shoes, means connecting said arms to each of said brake shoes, eccentric coupling means between said lower shoe and each of said upper shoes, said pivot constituting the sole means of support of said retarding device.

14. A brake comprising, in combination, a drum, a support including a pivot, a pair of arms movably mounted on said pivot, a segmental brake shoe within said drum, said segments being operatively connected to said arms and to each other, and one of said segments being operatively connected to both of said arms, said pivot constituting the sole means of support for said arms and brake shoe.

15. A brake comprising a drum, a central shoe within the drum, an auxiliary shoe at each end of said central shoe, spring means urging said shoes away from said drum, a pair of pivoted arms disposed between and connecting said central shoe and said auxiliary shoes, and means for urging said central shoe and said auxiliary shoes, successively, into engagement with said drum against the force of said spring means.

16. A brake comprising a drum, a pivot mounted therein, said pivot constituting the sole means of support of a friction device, said friction device comprising a pair of arms mounted for pivotal movement on said pivot means, a main brake shoe, auxiliary brake shoes eccentrically coupled to said main brake shoe, and means including a toggle connecting said main brake shoe to said arms.

17. A brake comprising a drum, a pivot mounted therein adjacent the top thereof, a pair of arms pivotally depending from said pivot, spring means urging the lower ends of said arms together, means including a toggle connecting said lower ends, a three part brake shoe hingedly connected adjacent the lower end thereof to each of said arms, movable cam means between the upper ends of said brake shoes and adapted to urge said upper ends toward said drum, means for transmitting movement of said cam means to actuate said toggle to spread the lower ends of said arms against the influence of said spring means, whereby the lower brake shoe is caused to move into engagement with said drum.

EUGENE HOPKINS.